Patented Aug. 3, 1948

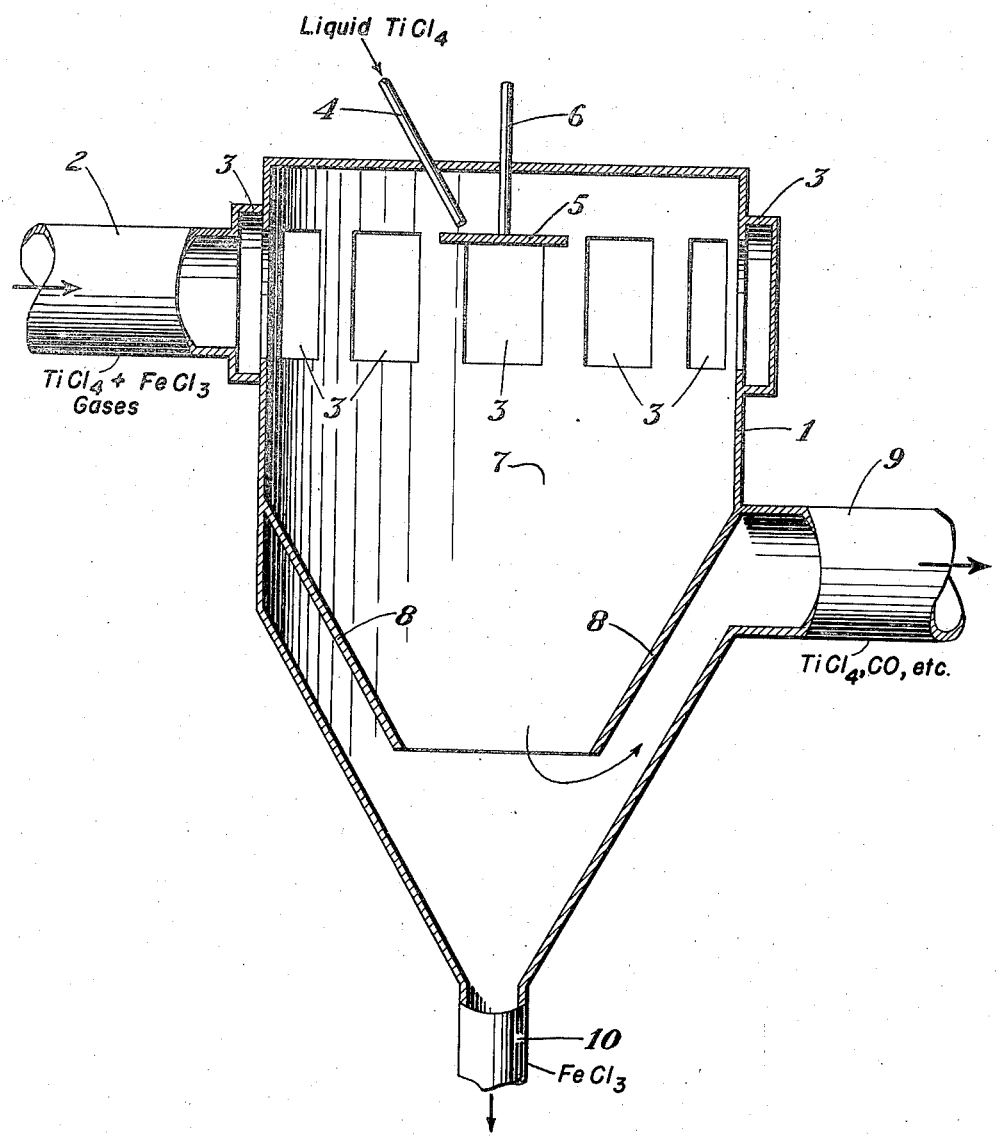

2,446,181

UNITED STATES PATENT OFFICE 2,446,181

PROCESS FOR CONDENSING VAPORIZED METAL HALIDES

Philip Berkeley Kraus, Chadds Ford, Pa., assignor to E. I. du Pont de Nemours & Company, Wilmington, Del., a corporation of Delaware Application April 3, 1946, Serial No. 659,412

8 Claims. (Cl. 183—115)

This invention relates to the condensation of vaporized materials which normally condense to the solid rather than liquid state. More particularly, it relates to the condensation of metallic halides, especially iron chloride, from vaporous mixtures containing the chlorides of both titanium and iron.

Titanium tetrachloride is generally produced by reacting titanium-bearing materials, such as ilmenite ore, at elevated temperatures with chlorine, usually in the presence of a reducing agent such as carbon, followed by volatilization of the titanium tetrachloride away from the residual solid mixture. Most titanium-bearing materials employed in the process contain substantial amounts of iron, and as a result iron (ferric) chloride also forms and is volatilized during the chlorination. The gases leaving the reactor normally comprise titanium tetrachloride, ferric chloride, carbon monoxide, carbon dioxide, unreacted chlorine and minor amounts of other metallic chlorides, including those of silicon or aluminum. If a mixture of chlorine with nitrogen rather than pure chlorine is employed in the chlorination, large amounts of nitrogen also exist in the exhaust gases.

As examples of typical, approximate compositions of the reactor discharge gases from a chlorination process in which a mixture of ilmenite and carbon is caused to be reacted with a chlorinating gas, the following tabulation is given:

| Chlorinating Gas | Chlorinating Gas | |
|---|---|---|
| | Case I 100% Chlorine | Case II 30% Chlorine, 70% Nitrogen |
| Titanium tetrachloride | 33.5% by vol | 10% by vol. |
| Ferric chloride (as $Fe_2Cl_6$) | 9.8 by vol | 2.9 by vol. |
| Carbon dioxide | 41.5 by vol | 12.3 by vol. |
| Carbon monoxide | 10.4 by vol | 3.1 by vol. |
| Chlorine | 4.8 by vol | 1.3 by vol. |
| Nitrogen | None | 70.4 by vol. |
| Silicon tetrachloride | Slight amount | Slight amount. |
| Aluminum chloride | do | Do. |

The boiling points at atmospheric pressure of titanium tetrachloride and of ferric chloride are, respectively, 136.4° C. and 315° C. The temperatures at which ferric chloride commences to condense from the gas mixture of the above type, i. e., the dewpoints thereof, are approximately 270° C. for case I and 250° C. for case II. The dewpoints for titanium tetrachloride in such mixture are approximately 100° C. and 65° C., respectively. The dewpoints for ferrous chloride, if present, would be approximately 580° C. and 530° C., respectively. These dewpoints represent the temperatures at which condensation begins, although progressively lower temperatures are required for condensation as the concentration diminishes. For example, the dewpoints of titanium and iron chlorides, present in a gas mixture to the extent of one per cent, are, respectively, 15° C. and 230° C.

In spite of the considerable difference in vapor pressures of titanium tetrachloride and of ferric chloride and the expectancy that their fractional separation through condensation might be relatively simple, the fractional condensation of their vaporized mixtures has proved practically very difficult, owing to the properties and characteristics of ferric chloride. Thus, at temperatures below its boiling point ferric chloride is a solid and hence condenses directly to that state from the gas phase. In conventional condensing apparatus the bulk of the cooling to effect condensation takes place through the condenser walls and the ferric chloride precipitates on such cool surfaces, tends to form a hard deposit thereon which is very difficult to remove, reduces heat transfer through the apparatus walls, and eventually plugs up and causes shutdown of the apparatus, due to its progressive buildup on such walls. If the condensation occurs in the gas stream, fine particles of solid ferric chloride remain in suspension and are carried out of the condenser with the uncondensed titanium tetrachloride gases. The presence of these suspended fine particles is very undesirable because they not only contaminate the titanium tetrachloride which is subsequently condensed, but they induce additional equipment plugging wherever the gas stream passes through a relatively narrow aperture in the apparatus.

Various expedients designed to overcome such undesired plugging and to provide a continuous type of chlorination operation have been proposed but none has proved practically effective for the intended purpose. For instance, it has been proposed to overcome the involved difficulties by condensing a substantial portion of the titanium tetrachloride with iron chloride to form a more fluid mass adapted to be removed from the condenser walls by mechanical means and to thereafter distill the titanium tetrachloride out of the condensed iron chlorides. Another proposal is to condense the iron chloride in the gas mixture, together with a substantial portion of the titanium tetrachloride, and to thereafter wash the vapor mixture containing a portion of the iron chloride with a spray of liquid titanium tetrachloride to "strip out" the suspended iron chloride.

It is among the objects of this invention to obviate these and other disadvantages of prior metal halide recovery methods, especially those existing in the recovery of titanium tetrachloride from gaseous mixtures with iron chloride, and to provide novel methods and means for attaining these objects. A particular object is to provide a commercially-useful, continuous type of process for separating and recovering TiCl4 from gaseous mixtures thereof with iron chloride and without the attendant, objectionable plugging and apparatus stoppage arising from ferric chloride condensation which has characterized prior recovery methods. An additional, specific object is to effect separation of the iron chloride in the form of a dry powder which is substantially free from titanium tetrachloride and thereby avoid the necessity of separately treating the iron chloride to recover further amounts of titanium tetrachloride. Additional objects and advantages of the invention will be apparent from the ensuing description and accompanying diagrammatic drawings in which:

Fig. I is a vertical sectional view of one type of apparatus which can be used in practicing the invention.

The foregoing as well as other objects and advantages are attainable in this invention which broadly comprises subjecting a gaseous metal halide mixture to treatment with a sufficient amount of a vaporizable liquid cooling medium to condense from said mixture substantially all of its halide component which will condense to the solid phase while concurrently effecting substantially complete vaporization of said vaporizable liquid and then separating the condensed product from the residual gases.

In a more specific and preferred embodiment, the invention comprises rapidly dispersing sufficient cool liquid titanium tetrachloride throughout a gaseous mixture of ferric chloride and titanium tetrachloride during its passage through a treating zone as will effect substantially complete condensation in said zone of all the ferric chloride present in said mixture and concurrently with such condensation vaporizing substantially all of the liquid titanium tetrachloride employed in the treating and dispersing operation, and then removing from said treating zone condensed ferric chloride produced therein.

In adapting the invention to practice, in accordance with such preferred embodiment and in, for example, an apparatus of the type shown in Fig. I, ferric chloride-titanium tetrachloride gas mixtures of the approximate compositions shown in the above cases I and II (depending on whether pure chlorine or a mixture of chlorine with nitrogen is used in their preparation) are fed to a suitable condenser 1 via a conduit 2 which is in open communication with a plurality of circumferentially-disposed condenser inlet ports 3 leading to the interior of said condenser. The gaseous mixture so fed the condenser can be prepared by chlorinating titaniferous materials, such as ilmenite, rutile, or similar TiO2 concentrates at elevated temperatures (600° C.–1100° C.) in the presence of a solid or gaseous reducing agent, such as carbon, charcoal, coal, etc., and in accordance with known procedures. One useful and preferred method for yielding an anhydrous metal chloride volatile at the temperature of formation comprises that disclosed in the co-pending application of Robert M. McKinney, Serial No. 588,973, filed April 18, 1945. Among other useful methods those of U. S. Patents Nos. 1,179,394, 1,528,319, and 1,878,013 comprise suitable examples.

Prior to its treatment in accordance with the present invention, the gaseous ferric chloride-titanium tetrachloride mixture from the reduction furnace is cooled in a suitable manner to a point substantially below the temperature at which it discharges from said furnace, but not below that necessary to maintain its ferric chloride content in vaporous state. Thus, the gaseous mixture may be cooled to below 600° C., and preferably to from about 400–500° C. (but not below 300° C., which would induce ferric chloride deposition). By such controlled cooling the necessity of utilizing an excess amount of liquid titanium tetrachloride in the subsequent fractional condensation is advantageously avoided.

After cooling, the gaseous mixture, as already stated, is introduced into the upper portion of the condenser 1 through the conduit 2 and ports 3. Simultaneous with such introduction, liquid titanium tetrachloride is also fed via conduit 4 into the upper portion of the condenser and tangentially discharged or impinged, as shown, upon the surfaces of a disc or plate member 5 secured in fixed relationship to a shaft 6 and capable of being rotated at a high rate of speed by means of an electric motor or other driving means (not shown). By reason of the high speed of rotation of the disk element 5, the impinged liquid TiCl4 is caused to be immediately broken up into relatively fine, minute droplets, which quickly admix with and thoroughly disperse in the form of a very fine spray or fog throughout the gas mixture fed into the condenser through the conduit 2 and ports 3. Care is exercised so that only an amount of liquid TiCl4 is supplied to the rotating disc which will induce both rapid and complete condensation of the iron chloride present in the gaseous mixture under treatment with simultaneous, concurrent vaporization in the zone of treatment of the liquid TiCl4 fed thereinto. This exercise of control over the amount of liquid TiCl4 used in the condensation is of primary importance because unless it is observed, production of a dry ferric chloride condensate free of TiCl4 will not result and all of the TiCl4 leaving the condenser will not be in the desired gaseous form. In the latter event, an expensive treating operation to recover the TiCl4 from the FeCl3 will be required.

The amount of liquid titanium tetrachloride used to accomplish these results can be conveniently arrived at by calculating in accordance with the formula $$\text{Lbs. of liq. TiCl}_4 = \frac{\text{cooling required in B. t. u.}}{85}$$

the liquid tetrachloride necessary to reduce the temperature of the gas mixture after mixing to from 130° C.–200° C., and preferably in the range between 150° C.–180° C., taking into account the latent heat of vaporization which is liberated by the condensation of iron chloride and that which is absorbed by the vaporization of liquid titanium tetrachloride. In the case of gas mixtures of the type referred to above, the amounts of liquid titanium tetrachloride at 18° C. required per pound of titanium tetrachloride in the gas mixture are 1.6 pounds for case I and 2.4 pounds for Case II. These figures neglect radiation losses from the condenser and are given merely to indicate the order of magnitude of the necessary addition of liquid TiCl₄. The actual amount required for any particular condenser system must be determined on the basis of the temperature obtained after mixing and obviously will vary with the composition and temperature of the furnace gases introduced into the condenser, the temperature of the liquid TiCl₄, and the design and degree of insulation of the condenser apparatus.

After being subjected to treatment with the required amount of liquid titanium tetrachloride, the treated gases pass downwardly through the treating zone 7, under the conical baffle members 8 for discharge from the condenser through the outlet 9. Condensed iron chloride which settles out in the condenser collects in the bottom thereof and is withdrawn therefrom, either periodically or continuously, via condenser outlet 10. The fraction of the total iron chlorides which thus settles out in the condenser is substantial in amount, but will vary with the condenser design. Normally, however, and in the type of condenser shown in Fig. I, which is provided with a conical bottom, more than 50% of the iron chloride fraction of the mixed gases will settle out for removal. Condensed iron chloride which does not settle out is removed from the condenser with the gas stream via the outlet 9 for passage to suitable separatory apparatus, such as a cyclone separator (not shown) or the like. Care must be taken to maintain these gases at a temperature above the dew point for titanium tetrachloride during separation in the cyclone. For this purpose any duct work should be either heated or well insulated and the separator itself should be maintained at temperatures ranging from about 140° C.–180° C. Separation in the cyclone will be found to be greatly facilitated by reason of the fact that the condensed iron chloride is completely dry so that there is little or no tendency for such condensate to stick to the internal walls of the separator.

As a result of the above treatment, substantially all of the iron chloride present in the mixture of furnace gases fed to and treated in the condenser is fractionally condensed and removed from such gases. Should any small amount of ferric chloride condensate remain in the residual gases following such treatment, their substantially complete removal can be effected by subjecting such residual gases to the stripping operation contemplated in my copending application Serial No. 659,411, filed April 3, 1946.

Advantageously the condensed ferric chloride formed as a result of my liquid TiCl₄ treatment is in the form of a dry powder, substantially free from titanium tetrachloride and need not be subjected to the additional filtrations, distillations, etc., with their accompanying difficulties, heretofore required to recover residual TiCl₄ from ferric chloride condensate. In addition, ferric chloride condensation takes place herein almost entirely out of contact with the walls of the condenser, so that no tendency exists for deposits of such condensate to form and build up on the walls of the condenser and cause apparatus plugging and stoppage. As a result, the invention affords a clean, economical, effective and continuous method for separating iron chloride from gaseous mixtures of that compound with titanium tetrachloride.

To a clearer understanding of the invention, the following specific example is given, which is merely illustrative and not to be considered as in limitation of the invention:

*Example*

A mixture of ilmenite ore and coal was chlorinated at about 900° C. in a furnace, 21,900 cubic feet of gas containing 29.8% chlorine and 70.2% nitrogen at room temperature being admitted to the furnace per hour, to result in an exit gas from the furnace having a percentage composition substantially the same as that shown in case II of the above table. The amount of titanium tetrachloride and ferric chloride produced per hour was 1050 and 523 pounds per hour. These gases were conveyed through ducts to a spray condenser of the type shown in Figure I, which was provided with a cylindrical section, a disc member rotating therein at 6000 R. P. M., and a conical bottom inclined thirty degrees from the perpendicular. The gases entered said condenser through a plurality of inlet ports and were at a temperature of 400° C.

2500 pounds per hour of liquid titanium tetrachloride at 18° C., containing 25 pounds of suspended iron chloride, were separately introduced into said condenser and directly impinged upon a surface of said rapidly-rotating disc member, being thereupon converted into a fine spray. Dry, powdered ferric chloride resulting from the operation collected in the bottom of the condenser in an amount averaging 276 pounds per hour and was periodically removed therefrom.

The gases leaving the condenser were at 170° C., contained on the average 28.0% by volume titanium tetrachloride, and immediately were introduced into a conventional type cyclone separator externally heated to maintain the temperature of the walls between 160° C. and 180° C., wherein 245 pounds of dry ferric chloride, substantially free from TiCl₄, per hour were separated.

The gases discharged from the cyclone were conveyed to a conventional type surface condenser wherein 96 per cent of the titanium tetrachloride was condensed by cooling to 27° C. This amounted to a yield of 3350 pounds per hour.

While described as applied to certain preferred embodiments, the invention is not limited thereto since variation therefrom may be resorted to without departing from its underlying principles and scope. Thus, though particularly useful in the separation of iron chloride from its gaseous mixtures with titanium tetrachloride, the condensation and separation is contemplated of that compound from other gaseous metal halide (especially chlorides) mixtures, such as of the metals tin, silicon, &c., which usually condense in the liquid phase and are more volatile than ferric chloride. Also the invention is applicable to separation of halides other than iron chloride which usually condense directly to the solid state from vaporous mixtures with halides more volatile than the halide condensing as a solid. For example, condensation and separation of chlorides of chromium, zirconium and aluminum may be effected from mixture of these chlorides with more volatile halides such as the chlorides of tin, silicon, sulfur, &c. Again, while relatively pure liquid titanium tetrachloride comprises a preferred cooling medium, other liquid media at least as volatile as said chloride, which completely vaporize during the ferric chloride condensation, are substantially non-reactive toward the gaseous mixture, and are easily separable therefrom, can also be used. Examples of additional cooling media include: carbon tetrachloride, gasoline, toluene, etc. Relatively impure forms of titanium tetrachloride may also be used, as can liquid TiCl₄ containing a suspension of ferric chloride. In the latter instance, the ferric chloride in suspension is also obtained as a dry solid.

Rapid dispersion or distribution of the cooling liquid throughout the gas mixture under treatment is preferably accomplished by the peripheral force exerted by the single rotating disc member 5. Alternatively, a plurality of these disc members or dispersing means, together with associated means for impinging the liquid TiCl₄ on the surfaces of each or all of said discs, may be used. Similarly, any other means for effecting the desired quick mixing and dispersal of the TiCl₄ liquid throughout the gaseous mixture entering the treating zone can be resorted to, such as one or more pressure spraying nozzles adapted to inject or atomize the liquid TiCl₄ directly in the form of a fine spray or fog into a high velocity stream of furnace gases.

Most efficient operation of my process results when resort is had to the relatively fine spray which results from impingement of liquid TiCl₄ onto a rotating surface with resulting intimate dispersion of the TiCl₄ throughout the furnace gases entering the condenser. In such instance, a more intimate, quicker mixing is obtained and instantaneous cooling and rapid condensation of the iron chloride takes place with simultaneous, complete vaporization of the liquid used in the treating operation. The finely-divided liquid TiCl₄ not only absorbs enough heat to condense the iron chloride, but also promotes formation of desired nuclei for promoting the condensation. As a result, the condensed iron chloride is in the form of very finely-divided particles, and since a larger number of condensation nuclei form, the likelihood of liquid being occluded by condensed iron chloride is considerably lessened. While such very fine spray use is preferred, it is not essential, since the benefits of the invention can be obtained even though the liquid tetrachloride should be admitted into the treating zone in relatively large droplets, provided a quick mixing and proper temperature control is exerted over the operation to effect complete condensation of the iron chloride and simultaneous vaporization of all the liquid TiCl₄ used in the treatment.

One of the principal advantages of the invention resides in the fact that all of the ferric chloride condensed is obtained in the form of a dry powder substantially free from titanium tetrachloride. Consequently it is desirable that means be provided for separating the iron chloride condensate from the gas stream, either by a suitably designed condenser, such as shown in Fig. I, by a cyclone separator, by a glass cloth filter bag, or the like, or by a combination of these means. Preferably, however, the gases leaving the condenser are caused to pass directly to a condenser of the type contemplated in my aforesaid co-pending application, wherein removal of the ferric chloride in slurry form is effected.

I claim as my invention:

1. A process for separating in the dry state a halide which condenses directly to the solid phase from its gaseous mixture with a more volatile metal halide, comprising treating said gaseous mixture with a sufficient amount of a vaporizable liquid cooling medium to effect substantially complete condensation of its solid phase condensing component while simultaneously vaporizing all of said liquid medium and then separating the solid halide condensate from residual gaseous products.

2. A process for removing iron chloride in the dry form from a gaseous mixture with a more volatile metal halide which comprises rapidly admixing with said gaseous mixture an amount of liquid titanium tetrachloride sufficient to condense substantially all of the iron chloride present in said mixture while simultaneously vaporizing all of the liquid titanium tetrachloride so employed, and then separating the iron chloride condensate from the residual vaporous halide products.

3. A process for removing an iron chloride in the dry form from a gaseous mixture with a more volatile metal halide which comprises rapidly dispersing sufficient liquid titanium tetrachloride throughout said gaseous mixture to condense substantially all of its iron chloride content and accompanying, simultaneous complete vaporization of the liquid TiCl₄ so employed, and then separating resulting iron chloride condensate from the residual vaporous halide products.

4. A process for removing ferric chloride in the dry form from a gaseous mixture with a more volatile metal halide which comprises rapidly and mechanically dispersing in said mixture an amount of liquid titanium tetrachloride sufficient to condense substantially all of its ferric chloride content while being simultaneously completely vaporized in the condensation process, and separating the condensed ferric chloride from the residual gaseous halide.

5. A process for removing ferric chloride in the dry form from a gaseous mixture with titanium tetrachloride which comprises mechanically dispersing throughout said gaseous mixture and in the form of fine, minute droplets, sufficient cool liquid titanium tetrachloride to effect condensation of substantially all of the iron chloride present in said mixture with concurrent, substantially complete vaporization of the TiCl₄ employed in the condensation, and separating the ferric chloride condensate from the gases so treated.

6. A process for removing ferric chloride in the dry form from a gaseous mixture with titanium tetrachloride which comprises introducing said gaseous mixture, while at a temperature ranging from 300–600° C., into a treating zone, mechanically and uniformly dispersing throughout said gases in said treating zone an amount of liquid titanium tetrachloride which is sufficient to effect condensation of substantially all of its iron chloride content and will be simultaneously vaporized during the condensation, and thereafter separating the condensed ferric chloride from the gases so treated.

7. A process for removing ferric chloride in the dry form from a gaseous mixture with titanium tetrachloride which comprises introducing said gaseous mixture, while at a temperature ranging from 400° C.–500° C., into a treating zone, mechanically and uniformly dispersing throughout said gases in said treating zone an amount of liquid titanium tetrachloride which is sufficient to effect condensation of all of its iron chloride content and will be simultaneously vaporized during the condensation, and thereafter separating the condensed ferric chloride from the gases so treated.

8. A process for removing iron chloride in dry form from a gaseous mixture containing a more volatile metal halide which comprises admixing with said gaseous mixture an amount of said more volatile metal halide, in liquid form, which is not in excess of that required to effect condensation of substantially all of the iron chloride present in said mixture while being simultaneously vaporized in the process, and separating the condensed iron chloride from the vaporous halide products.

PHILIP BERKELEY KRAUS.

REFERENCES CITED

The following references are of record in the file of this patent:

UNITED STATES PATENTS

| Number | Name | Date |
|---|---|---|
| 2,245,077 | Muskat et al. | June 10, 1941 |
| 2,245,358 | Pechukas | June 10, 1941 |
| 2,306,184 | Pechukas | Dec. 22, 1942 |
| 2,311,466 | Pechukas | Feb. 16, 1943 |